Patented Aug. 17, 1926.

1,596,595

UNITED STATES PATENT OFFICE.

MELVIN DE GROOTE, OF ST. LOUIS, AND WILBUR C. ADAMS, OF UNIVERSITY CITY, MISSOURI, ASSIGNORS TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing. Application filed October 1, 1925. Serial No. 59,955.

This invention relates to the treatment of emulsions of mineral oil and water, such as petroleum emulsions, for the purpose of separating the oil from the water.

Petroleum emulsions are of the water-in-oil type and comprise fine droplets of natural occurring water or brines dispersed in a more or less permanent state throughout the oil which constitutes the continuous phase of the emulsion. They are obtained from producing wells and from the bottom of oil storage tanks and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion to the action of a non-sulphonated, halogen free, aromatic ester of an organic soap-forming group in such a manner that the emulsion will "break" and separate into its component parts of oil and water or brine when the emulsion is permitted to remain in a quiescent state after treatment.

A treating agent of the kind referred to can be produced from non-sulphonated, aromatic esters of organic detergent materials, such as fats, fatty acids, naphthene acids, rosin, etc. One method that can be used to prepare such materials is to hydrolyze an ester containing a sulpho-aromatic group so as to split off the sulphonic group, thus leaving a non-sulphonated ester. Another method is to mix an aromatic, acting essentially as an alcohol, such as cresol, phenol or naphthol with an organic acid, such as oleic, iso-oleic, rosin and a dehydrating agent, such as phosphorous oxide. These are well known organic methods of synthesis for this class of materials. (See Lassar Cohn "Arbeits Methoden für Orgonisch Chemische Laboratorien" (Working Methods for Organic Chemical Laboratories), fifth ed. special part, pages 179, 155 and 158.)

In practising our process a treating agent of the kind mentioned is brought into contact with an emulsion either by introducing the treating agent into a well in which a petroleum emulsion is being produced; introducing the treating agent into a conduit through which a petroleum emulsion is flowing; introducing the treating agent into a tank in which a petroleum emulsion is stored, or introducing the treating agent into a container that holds a sludge obtained from the bottom of an oil storage tank. The treating agent can then be introduced into a producing well in such a way that it will become mixed with water and oil that is emerging from the ground before said water and oil enter the barrel of the well pump or the tubing up through which said water and oil flow to the surface of the ground. After treatment, the emulsion is allowed to stand in a quiescent state at a suitable temperature, so as to permit the water or brine to separate from the oil, or it may be passed through a variety of apparatus, such as hay tanks, gun barrels, etc., such as are now commonly used in the operation of breaking petroleum emulsions. It may even be passed through a centrifugal or electrical dehydrator.

Having thus described our invention, what we claim as new and desire to secure by Letters Patent is:

1. A process for treating petroleum emulsions, characterized by subjecting the emulsion to the action of a treating agent consisting of an aromatic ester of an organic soap-forming group, containing no chemically combined elements other than carbon, hydrogen and oxygen.

2. A process for treating petroleum emulsions, characterized by subjecting the emulsion to the action of a treating agent consisting of an aromatic ester of a fatty material, containing no chemically combined elements other than carbon, hydrogen and oxygen.

MELVIN DE GROOTE.
WILBUR C. ADAMS.